United States Patent
Murata et al.

(10) Patent No.: US 8,728,383 B2
(45) Date of Patent: May 20, 2014

(54) CERAMIC COMPOSITE MATERIAL

(75) Inventors: Hiroshige Murata, Tokyo (JP); Takeshi Nakamura, Tokyo (JP); Yasutomo Tanaka, Tokyo (JP)

(73) Assignees: Ishikawajima-Harima Heavy Industries Co., Ltd., Tokyo (JP); The Society of Japanese Aerospace Companies, Inc., Tokyo (JP)

( * ) Notice: Subject to any disclaimer, the term of this patent is extended or adjusted under 35 U.S.C. 154(b) by 2203 days.

(21) Appl. No.: 11/693,200

(22) Filed: Mar. 29, 2007

(65) Prior Publication Data

US 2008/0081757 A1    Apr. 3, 2008

(30) Foreign Application Priority Data

Sep. 28, 2006  (JP) ................ P2006-266045

(51) Int. Cl.
C04B 35/573 (2006.01)

(52) U.S. Cl.
USPC ......................................... 264/640; 264/682

(58) Field of Classification Search
USPC .............................. 264/640, 682
See application file for complete search history.

(56) References Cited

U.S. PATENT DOCUMENTS

| | | | | | |
|---|---|---|---|---|---|
| 4,485,085 | A | * | 11/1984 | David et al. ............. | 423/594.1 |
| 6,444,165 | B1 | * | 9/2002 | Eckert ....................... | 266/196 |
| 2001/0008651 | A1 | * | 7/2001 | Okada ....................... | 427/214 |
| 2001/0046563 | A1 | * | 11/2001 | Nakamura et al. ....... | 427/376.2 |
| 2003/0165638 | A1 | * | 9/2003 | Louks et al. ............. | 427/600 |
| 2004/0119188 | A1 | * | 6/2004 | Lowe ........................ | 264/131 |
| 2004/0155389 | A1 | * | 8/2004 | Eckert ....................... | 266/236 |
| 2004/0231307 | A1 | * | 11/2004 | Wood et al. ............. | 55/523 |
| 2006/0171873 | A1 | * | 8/2006 | Inoue ........................ | 423/345 |

FOREIGN PATENT DOCUMENTS

| | | |
|---|---|---|
| JP | 02-175656 | 7/1990 |
| JP | 05-306180 | 11/1993 |
| JP | 11-012038 | 1/1999 |
| JP | 11-049570 | 2/1999 |
| JP | 2000-327425 | 11/2000 |
| JP | 2001-335378 | 12/2001 |
| JP | 2002-097074 | 4/2002 |
| JP | 2003-261381 | 9/2003 |

OTHER PUBLICATIONS

Office Action issued on Mar. 13, 2012 in the counterpart Japanese application No. 2006-266045 with English translation.

* cited by examiner

*Primary Examiner* — Joseph S Del Sole
*Assistant Examiner* — Russell Kemmerle, III
(74) *Attorney, Agent, or Firm* — Oblon, Spivak, McClelland, Maier & Neustadt, L.L.P.

(57) ABSTRACT

A ceramic composite material is comprised of a fabric of fibers of an inorganic substance; and a matrix for combining the fibers. The matrix consists essentially of a ceramic. The matrix is formed by burying the fabric in a mixture of a powder of carbon, a powder of silicon and a medium including an organic solvent, producing an oscillation in the mixture to impregnate the fabric with the mixture, and calcining the fabric impregnated with the mixture.

12 Claims, 3 Drawing Sheets

CERAMIC COMPOSITE MATERIAL

CROSS-REFERENCE TO RELATED APPLICATIONS

This application is based upon and claims the benefit of priority from the prior Japanese Patent Application No. 2006-266045 (filed Sep. 28, 2006); the entire contents of which are incorporated herein by reference.

BACKGROUND OF THE INVENTION

1. Field of the Invention

The present invention relates to a ceramic composite material applied to component members of a jet engine for an airplane and such and a production method for the same.

2. Description of the Related Art

Ceramics are in general prominently refractory but on the other hand many ceramics have disadvantage of brittleness. To overcome the disadvantage of brittleness, some attempts to form composite materials, in which any ceramic is applied to a matrix to combine fibers of any inorganic matter such as silicon carbide (SiC), have been made.

As one of methods suitable for forming such composite materials, there is proposed a Polymer Impregnation and Pyrolysis ("PIP" hereinafter) method. In the PIP method, a fabric of fibers consisting of SiC or such is immersed in a polymer solution and the immersed fabric is calcined at a proper high temperature to form a composite material of a ceramic and fibers. The polymer solution is properly selected in accordance with a kind of ceramics to be produced after calcining. For example, if a solution containing polycarbosilane is applied, a matrix consisting of SiC is produced. As disadvantages of the PIP method, it may be exemplified that shrinkage occurring in the course of calcining may lead to deterioration of bonding between the matrix and the fibers or generation of any defects such as micro-pores and cracks in the matrix.

Japanese Patent Application Laid-open No. 2001-335378 discloses a related art of a slurry immersion method, which is intended for overcoming the above disadvantages. In the slurry immersion method, powder-like carbon and silicon are suspended in a solvent such as a methanol solution to form slurry. A fabric is immersed in the slurry and calcined to produce a ceramic composite material. Because reactions occur among solid phases to produce SiC, shrinkage in the course of calcining is limited in a relatively small degree.

SUMMARY OF THE INVENTION

According to the above-cited art, the shrinkage of the matrix accompanying calcining can be suppressed. However, the inventors found out that obtained ceramic composite materials in general have relatively low densities as compared with ideal densities and therefore it is concluded that pores among the fibers are insufficiently filled by SiC.

The present invention is intended for providing a ceramic composite material having an improved degree of filling a matrix into pores among fibers and a production method thereof.

In accordance with a first aspect of the present invention, a ceramic composite material is comprised of a fabric of fibers consisting essentially of an inorganic substance; and a matrix for combining the fibers, the matrix consisting essentially of a ceramic formed by burying the fabric in a mixture consisting essentially of a powder of carbon, a powder of silicon and a medium including an organic solvent, producing an oscillation in the mixture to impregnate the fabric with the mixture, and calcining the fabric impregnated with the mixture.

Preferably, the medium includes a polymer ingredient. More preferably, the medium is prepared so as to have a viscosity of from 0.8 mPaS to 4 mPaS. Further preferably, the oscillation is produced by applying an ultrasonic oscillation. Still preferably, the powder of carbon has a grain size of from 1 μm to 20 μm and the powder of silicon has a grain size of from 1 μm to 75 μm. Still more preferably, the powder of carbon has a specific surface of 14.2 $m^2/g$ or less. Still further preferably, the inorganic substance consists essentially of silicon carbide. Again preferably, the matrix includes silicon carbide. Yet preferably, the fabric with the matrix has an impregnation ratio of from 20% to 100%.

The ceramic composite material may further include an interface layer covering the fibers. The interface layer is preferably formed by a CVD method preliminary to forming the matrix. The ceramic composite material may further includes a second ceramic phase consisting essentially of SiC and partially combining the fibers. The second ceramic phase is preferably formed by a CVI method preliminary to forming the matrix.

In accordance with a second aspect of the present invention, a method for production of a ceramic composite material is comprised of preparing a mixture consisting essentially of a powder of carbon, a powder of silicon and a medium including an organic solvent; burying a fabric of fibers consisting essentially of an inorganic substance in the mixture; producing an oscillation in the mixture to impregnate the fabric with the mixture; and calcining the fabric impregnated with the mixture.

Preferably, the method is further comprised of leaving the mixture at rest so as to form a precipitation, wherein the fabric is buried in the precipitation at the step of burying. More preferably, the medium includes a polymer ingredient. Still preferably, the method is further comprised of preparing the medium so as to have a viscosity of from 0.8 mPaS to 4 mPaS. Still more preferably, an ultrasonic oscillation is applied at the step of producing. Still further preferably, the powder of carbon has a grain size of from 1 μm to 20 μm and the powder of silicon has a grain size of from 1 μm to 75 μm. Preferably, the powder of carbon has a specific surface of 14.2 $m^2/g$ or less. More preferably, the organic solvent consists essentially of xylene.

The method may be further comprised of forming a interface layer on the fibers by a CVD method and/or infiltrating a second ceramic phase of SiC into spaces among the fibers by a CVI method.

DETAILED DESCRIPTION OF THE PREFERRED EMBODIMENT

Figure 1:
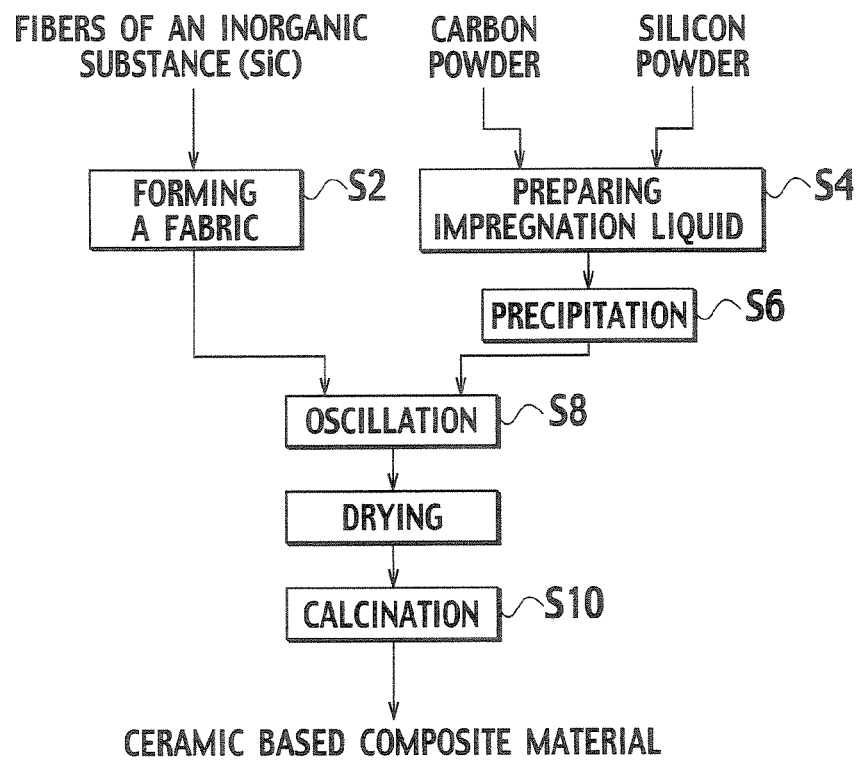
FIG. 1 illustrates production steps of a ceramic composite material in accordance with an embodiment of the present invention.

An embodiment of the present invention will be described hereinafter with reference to FIGS. 1 and 2. Throughout the specification and appended claims, the phrase of "polymer ingredient" is defined and used as a meaning of a polymer capable of generating SiC and/or C (carbon) when calcined. Further, an impregnation ratio of a fabric having pores with a matter is defined as a ratio of a total volume of the matter filling the pores to a total volume of the pores.

A ceramic composite material in accordance with the embodiment is preferably applied to machine components subject to high-temperature atmospheres, such as components of a jet engine for an airplane. A turbine blade, a combustor, an after burner and such may be exemplified as such uses but may have further various uses, of course.

Production of the ceramic composite material in accordance with the present embodiment is started with a fabric formation step S2, in which raw fibers of silicon carbide (SiC) are woven and cut into a predetermined shape depending on its use so as to be a fabric 10. Any commercially available fibers of SiC may be applied to the raw fibers, and those available in the trade name of TYRANNO FIBER ZMI grade (UBE Industries Ltd.) may be preferable. As well as the fibers of SiC, any fibers of one selected from the group of inorganic substances may be applicable in accordance with required properties.

In this step S10, the fabric 10 may be further subject to any processes. One is to form interface layers consisting essentially of carbon, boron nitride or any substance capable of increasing adhesion strength of a matrix described later on the respective fibers of the fabric 10. Another is to infiltrate a ceramic phase into spaces among the fibers preliminary to the following processes, which may partially combine the fibers and increase impregnation ratio of the fabric described later. A Chemical Vapor Deposition Method (referred to as "CVD" hereinafter) is preferably applied to the process of forming the interface layers. By applying the CVD method to the fabric, vapor including ingredient substances of the interface layers, such as hydrocarbon or a combination of borane and nitrogen, undergoes vapor-phase chemical reactions to form the interface layers respectively on the fibers. A Chemical Vapor Infiltration ("CVI" hereinafter) method is preferably applied to the process of infiltrating the ceramic phase into the spaces among the fibers. The CVI method applied to the fabric causes to form and infiltrate the ceramic phase of, preferably but not limited to, SiC into the spaces among the fibers. Further details of these methods will not be described as they in themselves have been already publicly known. Of course, any other processes may be applied thereto. A fabric treated with any one or more of these processes would be referred to as an intermediate body. However, both an untreated fabric and a treated fabric will be commonly referred to as a fabric unless special distinction therebetween is necessary.

In parallel with the above step, a mixture 20 for impregnation of the fabric 10 is prepared (an impregnation liquid preparation step S4). The mixture 20 contains a powder of carbon, a powder of silicon, and a medium of an organic solvent. More preferably, the medium contains a polymer ingredient.

To the powder of carbon, a carbon powder chemically synthesized in a vapor phase, a powder of graphite synthesized by calcining or such, a powder of natural graphite or any such carbon powder may be applied. The powder of silicon also does not require any limitation to properties thereof and any commercially available powder may be applied thereto. Grain sizes of the powder of carbon and the powder of silicon are not limited to but preferably from 1 µm to 20 µm on an average. More preferably, respectively on an average, a grain size of the powder of carbon is about 6 µm and a grain size of the powder of silicon is about 4 µm. The reason why these grain size ranges are preferable is as follows. Powders having greater grain sizes insufficiently enter into pores among the fibers of the fabric 10 and powders having smaller grain sizes also lead to a relatively small impregnation ratio.

The polymer ingredient is a polymer which generates SiC and/or C (carbon) when calcined. Throughout the specification and appended claims, the phrase of "polymer ingredient" is defined and used as such. A polymer which generates SiC is any proper organic silicon polymer having both carbon and silicon in its chain, and preferable examples thereof are polycarbosilane and polytitanocarbosilane. A polymer which generates C is any organic polymer, a chain of which consists essentially of carbon, and a preferable example thereof is phenol. In a case where the polymer ingredient consists essentially of a polymer generating C, a mixing ratio of the powder of carbon to the powder of silicon should be specially regulated so that a molar ratio of Si to C in total including the polymer ingredient comes to be 1:1, which differs from that described later. An example in which polycarbosilane is applied to the polymer ingredient will be described hereinafter.

As the organic solvent, methanol, ethanol and xylene may be exemplified but it is not limited thereto. In a case where the mixture 20 includes a polymer ingredient, any organic solvent proper for dissolving the polymer ingredient therein, for example xylene, is preferable. A polymer ingredient dissolving in an organic solvent will be referred to as a polymer solution hereinafter. The polymer solution is a liquid having a degree of viscosity and is a medium for the powder consisting essentially of carbon and the powder consisting essentially of silicon as described later. Viscosity of the polymer ingredient in a proper degree contributes to suppression of condensation of the powders to maintain the powders in a proper dispersion state. This promotes impregnation of the pores among the fibers of the fabric with the powders in an oscillation step described later.

A viscosity of the polymer solution is regulated by controlling a mixing ratio of polycarbosilane to xylene. The viscosity can be regulated upon measurement of viscosity in accordance with a method of "viscosity of liquids—a measurement method" regulated under a code of JIS-Z8803 in Japanese Industrial Standards for example. An extremely small viscosity leads to reduction in impregnation ratio of the fabric with the powders. An extremely large viscosity causes disadvantage in handling, namely for example long time is required for mixing the powder with the liquid in uniformity. Therefore, a viscosity of from 0.8 mPaS to 4 mPaS is preferable.

The powder consisting essentially of carbon and the powder consisting essentially of silicon are mixed to have a mixing ratio of 1:1 in molar ratio (about 3:7 in weight ratio), and are added to the organic solvent or the polymer ingredient with a controlled viscosity. These substances are sufficiently mixed so as to have uniformity, thereby a mixture 20 is obtained.

The component 20 is left at rest so as to form a precipitation 30 if the precipitation 30 may come out (a precipitation step S6). Reduction of pressure for defoaming is preferably carried out.

The fabric 10 is buried in the mixture 20 or the precipitation 30 if the precipitation 30 comes out, and an oscillation is produced in the mixture 20 by applying vibration from the exterior (an oscillation step S8). A condition of oscillation is not specifically limited but application of an ultrasonic oscillation device is preferable. An ultrasonic oscillation device commercially available in the trade name of SONOQUICK (Ultrasonic Engineering Co., Ltd.) for example may be applied to the oscillation. The oscillation in the mixture 20 is preferably produced by an ultrasonic wave at 38 kHz with output of 250 W for 10 minutes generated by this device. This oscillation step may be carried out under a normal temperature and a normal pressure, but may be carried out under reduced pressures or elevated pressures.

By means of the oscillation step, the mixture 20 partly enters into the pores among the fibers of the fabric 10. While a composition of what enters into the pores does not necessarily reflect a composition of the mixture 20, not only polycarbosilane but also a mixture of the powder of carbon, the powder of silicon and polycarbosilane enters into the pores. As what enters into the pores will become a ceramic, it is referred to as a ceramic precursor hereinafter.

Next, the fabric 10 is pulled up from the mixture 20 and is exposed to a proper elevated temperature so as to be dried. Further, the fabric 10 impregnated with the ceramic precursor is calcined or burned (a calcination step S10). The calcination is achieved by carrying out a heat treatment on the pulled-up fabric 10 in a furnace purged by or filled with an inert gas such as argon. The heat treatment is preferably carried out at temperatures of 1414 degrees C., which is a melting point of silicon, or more because reactions are promoted if the powder of silicon melts. On the other hand, extremely high temperatures may prominently shorten the life time of the furnace, therefore a maximum temperature of the heat treatment is preferably about 1450 degrees. A treatment time is preferably about 60 minutes at the maximum temperature. By calcination, the powder of silicon reacts with the powder of carbon to form SiC, and polycarbosilane also carry out pyrolysis and reaction between silicon and carbon in its chain to form SiC. Reaction among polycarbosilane, the powder of silicon and the powder of carbon may also occur. More specifically, by calcination, a matrix consisting essentially of SiC comes out of the ceramic precursor to fill the pores among the fibers and combine the fibers. After the calcination step, slow cooling is carried out so as to prevent excessive thermal shock on the product, and the product of the ceramic composite material is extracted from the furnace. The ceramic composite material will be applied to various members after machining as need arises.

To verify effects of the present invention, examinations are carried out with respect to the following working examples and comparative examples.

SiC fibers having a diameter of 11 μm, commercially available in the name of TYRANNO FIBER ZMI grade (Ube Industries Co., Ltd.), were three-dimensionally woven to have an orientation ratio of x:y:z=0.6:1:0.14, and thereby a fabric having a pore rate of 40 vol % is obtained. The fabric was made into plate-like test pieces of rectangles being 191 mm in length, 130 mm in width, and 9.2 mm in thickness. A plurality of test pieces were produced and these dry weights were respectively measured.

Example 1

A powder consisting essentially of spherical carbon having an average particle size of 5 μm, commercially available in the trade name of NICABEADS ICB-0520 (Nippon Carbon Co., Ltd.), a powder consisting essentially of laminar synthetic graphite (average particle size of 4.5 μm), commercially available in the trade name of UF-G10 (Showa Denko K.K), and a powder consisting essentially of clastic carbon (average particle size of 6 μm), commercially available in the trade name of NICABEADS MPX-6 (Nippon Carbon Co., Ltd.) were applied. As a powder consisting essentially of silicon, a silicon powder of 75 μm (Kojundo Chemical Laboratory Co., Ltd.) crushed into a powder of 4 μm in average particle size by a ball mill is applied. These three combinations of the powders of carbon with the powder of silicon were provided for mixing so as to a molar ratio of 1:1 (about 3:7 in weight ratio) and respectively mixed in methanol so as to have sufficient uniformity. Thereby respectively three kinds of mixtures were obtained. The mixtures had been left at rest for a proper time so as to come out precipitations. The test pieces were respectively buried in the precipitations and an ultrasonic wave of 38 kHz with output of 250 W had been applied thereto for 10 minutes by means of an ultrasonic oscillation device commercially available in the trade name of SONOQUICK (Ultrasonic Engineering Co., Ltd.). Subsequently, the test pieces were pulled up and exposed to a dry atmosphere at 105 degrees C. so as to sufficiently evaporate methanol therein. Then weights thereof were respectively measured. Next, calcinataion was carried out by keeping the test pieces in an argon atmosphere at 1450 degrees C. for 60 minutes. After the calcination, slow cooling was carried out and then weights thereof were again measured.

Meanwhile, NICABEADS ICB-0520 is a powder of carbon having a nearly completely spherical shape produced by vapor phase synthesis and will be referred to as a spherical carbon powder or such herein after. NICABEADS MPX-6 is a powder of carbon having an angular clastic shape produced by crashing and will be referred to as a clastic carbon powder or such. As with them, UF-G10 will be referred to as a laminar carbon powder or such based on its shape.

Example 2

Three kinds of polymer solutions respectively having viscosities of 0.7, 0.9 and 3.7 mPaS were prepared by mixing polycarbosilane and xylene and controlling mixing ratios thereof. A measurement method for the viscosities complied with JIS-Z8803. The aforementioned NICABEADS MPX-6 and the aforementioned silicon powder were mixed so as to have a molar ratio of 1:1 (about 3:7 in weight ratio) and subsequently mixed with the respective polymer solutions. Mixing was sufficiently carried out so as to have uniformity, then mixtures were obtained. The mixtures had been left at rest for a proper time so as to come out precipitations. The aforementioned test pieces were respectively buried in the precipitations and an ultrasonic wave of 38 kHz with output of 250 W had been applied thereto for 10 minutes as with the aforementioned example. Subsequently, the test pieces were pulled up and exposed to a dry atmosphere at 105 degrees C. so as to sufficiently evaporate xylene therein. Then weights thereof were respectively measured. Next, calcinataion was carried out by keeping the test pieces in an argon atmosphere at 1450 degrees C. for 60 minutes. After the calcination and slow cooling, weights thereof were again measured.

Comparative Example

For the purpose of comparison with the present inventions production of ceramic composite material by a slurry immersion method as a prior art was tested. A powder consisting essentially of spherical carbon having an average particle size of 5 μm commercially available in the trade name of NICABEADS ICB-0520 (Nippon Carbon Co., Ltd.) and the silicon powder having an average particle size of 4 μm were mixed so as to have a molar ratio of 1:1 (about 3:7 in weight ratio) and subsequently suspended in ethanol to form a slurry. The plate-like test piece or the cylindrical test piece as mentioned above had been immersed in the slurry for 10 minutes. Subsequently, the test piece was pulled up and exposed to a dry atmosphere at 105 degrees C. so as to sufficiently evaporate ethanol therein. Then a weight thereof was measured. Next, calcinataion was carried out by keeping the test piece in an argon atmosphere at 1450 degrees C. for 60 minutes. After the calcination and slow cooling, a weight thereof was again measured.

The examples and the comparative example are summarized in Table 1.

TABLE 1 a summary of the examples and the comparative example

| Ref. | | Carbon powder | Silicon powder | Organic solvent, Polymer ingredient | oscillation |
|---|---|---|---|---|---|
| A | EXAMPLES 1 | Spherical 5 μm | 4 μm in average grain size | methanol | applied |
| B | | Laminar 4.5 μm | | | |
| C | | Clastic 6 μm | | | |
| D | EXAMPLES 2 | Clastic 6 μm | | xylene + polycarbosilane 0.7 mPaS | |
| E | | | | xylene + polycarbosilane 0.9 mPaS | |
| F | | | | xylene + polycarbosilane 3.7 mPaS | |
| a | COMPARATIVE EXAMPLE | Spherical 5 μm | | ethanol | not applied |

Impregnation ratios of the fabrics with the powders are defined and calculated in accordance with the following equations. An impregnation ratio $I_0$ before calcination is represented by:

$$I_0 = \frac{(w_2 - w_1)/d_{powder}/V_{fill}}{(w_1/d_{CMC}) \cdot V_{void}}, \quad (1)$$

where $w_1$, $w_2$ are weights of a test piece respectively before and after impregnation;

$d_{powder}$ is a density of a powder subject to impregnation (g/cm$^3$);

$V_{fill}$ is an ideal filling rate provided that spherical particles are filled in the pores, namely 52.4%;

$d_{CMC}$ is a bulk density of a test piece before impregnation (g/cm$^3$); and $V_{void}$ is a pore rate of a test piece before impregnation (%)

Meanwhile, $d_{powder}$ is obtained by the equation of:

$$d_{powder} = \frac{M_{Si} + M_C}{(M_{Si}/d_{Si} + M_C/d_C)}, \quad (2)$$

where $M_{Si}$, $M_C$ are atomic weights of silicon and carbon, respectively; and $d_{Si}$, $d_C$ are densities of silicon and carbon, respectively (g/cm$^3$).

Further, an impregnation ratio $I_R$ after calcination is defined and calculated in accordance with the following equation.

$$I_R = (d_{powder}/d_{SiC}) \cdot I_0 \quad (3)$$

Figure 2:
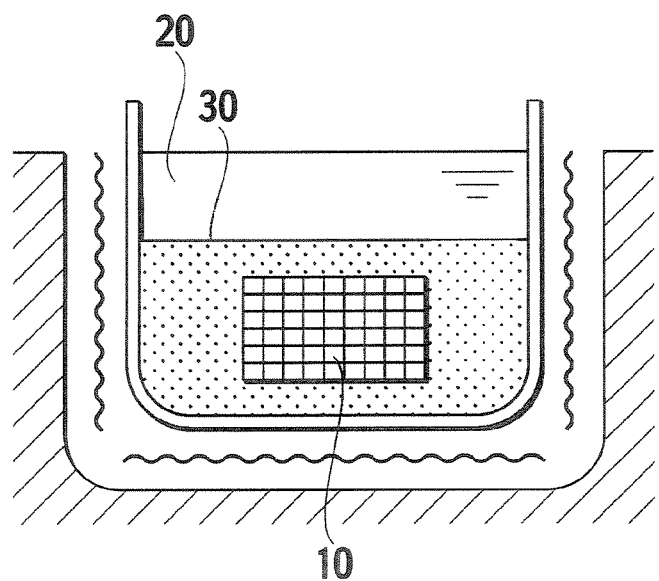
FIG. 2 schematically illustrates a step of oscillation in the production steps.
Figure 3:
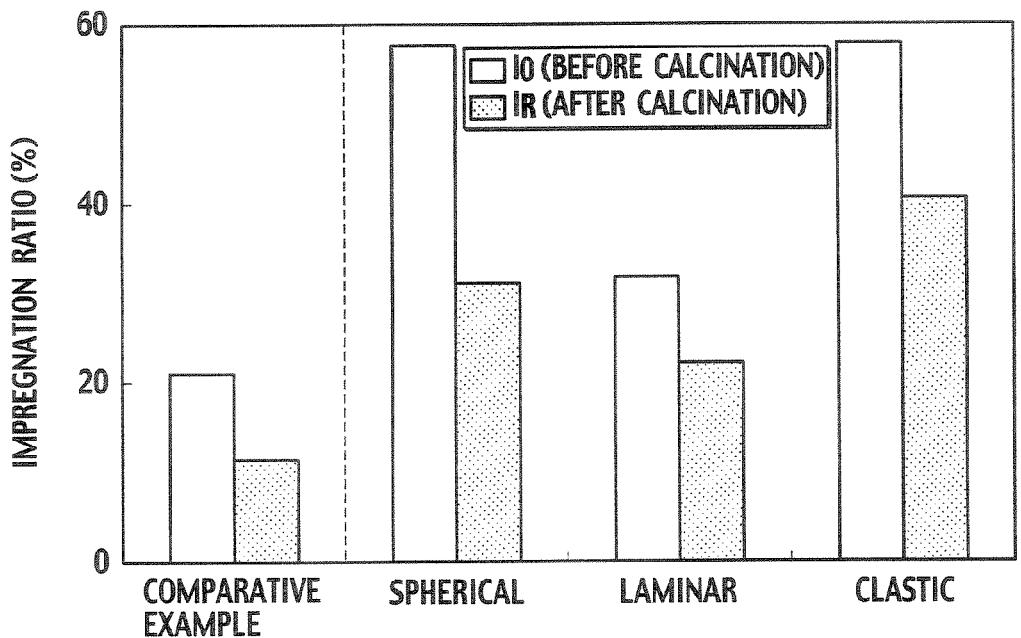
FIG. 3 shows a comparison of impregnation ratios between a working example and a comparative example.

Calculation results derived from the above equations are made into graphs of FIGS. 2 and 3.

FIG. 3 shows impregnation ratios of the examples 1 as compared with the comparative example. "SPHERICAL", "LAMINAR" and "CLASTIC" indicated along the horizontal axis of the graph are indications of the respective examples expressed by features of the carbon powders. As compared with the impregnation ratios before the calcination, those after the calcinations are reduced because reactions by the calcination cause volume contraction occurring to any of the pieces. In either comparison before or after the calcination, the examples 1 have greater impregnation ratios than that of the comparative example. This result clarifies an effect of ultrasonic oscillation via the organic solvent on promotion of impregnating the fabric with the powders of carbon and silicon. Further, if comparing the test pieces among the examples 1, merely a small difference between the impregnation ratios of the spherical carbon powder and the clastic carbon powder before calcination is observed. More specifically, it is noted that a relatively high impregnation ratio can be obtained in accordance with the present invention even though the shape of the carbon powder is not made spherical. Further, if comparing the impregnation ratios after calcination, a relatively great drop in impregnation ratios of the test piece to which the spherical carbon is applied after calcination as compared with that before calcination is observed, whereas a smaller drop in impregnation ratios with respect to the test piece to which the clastic carbon is applied is observed. The reason may be put to a difference in natures or origins of the carbon powders. More specifically, the spherical carbon powder is produced by vapor phase synthesis and hence has a relatively sparse or porous structure (density of 1.35 g/cm$^3$). Therefore a relatively great volume contraction occurs to the spherical carbon powder by reactions under calcination. In contrast, the clastic carbon powder is produced by crushing a carbon bulk formed under extremely high pressure and hence has a relatively dense structure (density of 2 g/cm$^3$). Therefore, a relatively small volume contraction occurs to the clastic carbon powder. More specifically, the present invention provides small dependence of an impregnation ratio on a shape of the carbon powder. Therefore, one may have a greater freedom of selection of carbon powders and therefore may regard natures or origins as more important to select one from the carbon powders.

Figure 4:
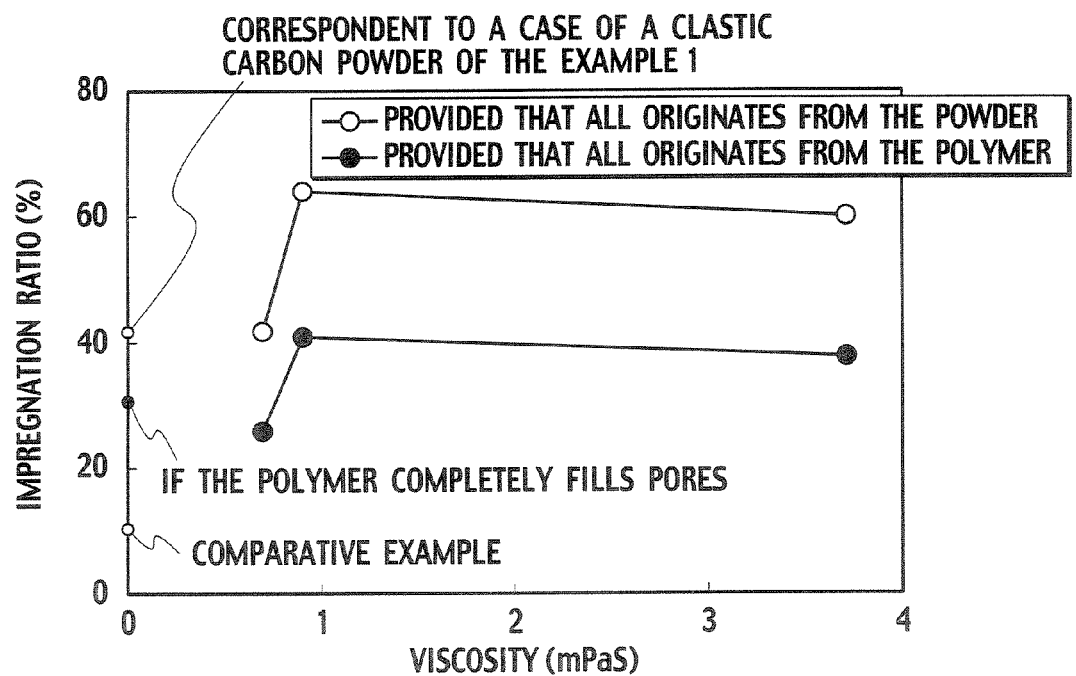
FIG. 4 is a graph showing an influence of viscosities on impregnation ratios.

FIG. 4 is a graph showing an effect of polycarbosilane as a ceramic precursor further contained in the organic solvent on impregnation ratios with respect to the examples 2. Because what fills the pores in the fabric includes not only the carbon powder and the silicon powder but also polycarbosilane and moreover a ratio among them is not necessarily correspondent to a ratio in the original mixture, calculation of impregnation ratios cannot be carried out without any assumptions.

Therefore, two sets of calculations of impregnation ratios after calcination are made to draw the graph of FIG. 4, one on the assumption that all of the generated ceramic is originated from the powder, another on the assumption that all of the generated ceramic is originated from polycarbosilane. For comparison, a value of the test piece among the example 1 to which the clastic carbon powder is applied and a value of the test piece of the comparative example are plotted on the vertical axis of the graph of FIG. 4. Further for reference, a calculation is made on the assumption that the pores are completely filled with polycarbosilane, and a value resulted from the calculation is further plotted on the vertical axis. The impregnation ratio in a case of a viscosity of 0.7 mPaS has little difference from that of the example 1. However, in a case where a viscosity goes beyond 0.7 mPaS, the impregnation ratios increase over this value. Because the value calculated on the assumption that the pores are completely filled with polycarbosilane is smaller than those, the increase in the impregnation ratios cannot be unaccountable merely for an effect that polycarbosilane fills spaces among powder particles. As the mixture in the examples 2 is diluted by xylene to a considerable extent, it is inherently impossible that the pores are completely filled with polycarbosilane. More specifically, the results could be considered to come from not only the effect that the pores are filled with polycarbosilane but also proper viscosities may promote impregnation of the fabric with the powders. While the reason has never become clear at this moment, it could be estimated that existence of a medium having a proper viscosity suppresses condensation of the powder particles and thereby the effect of oscillation is enhanced.

Figure 5:
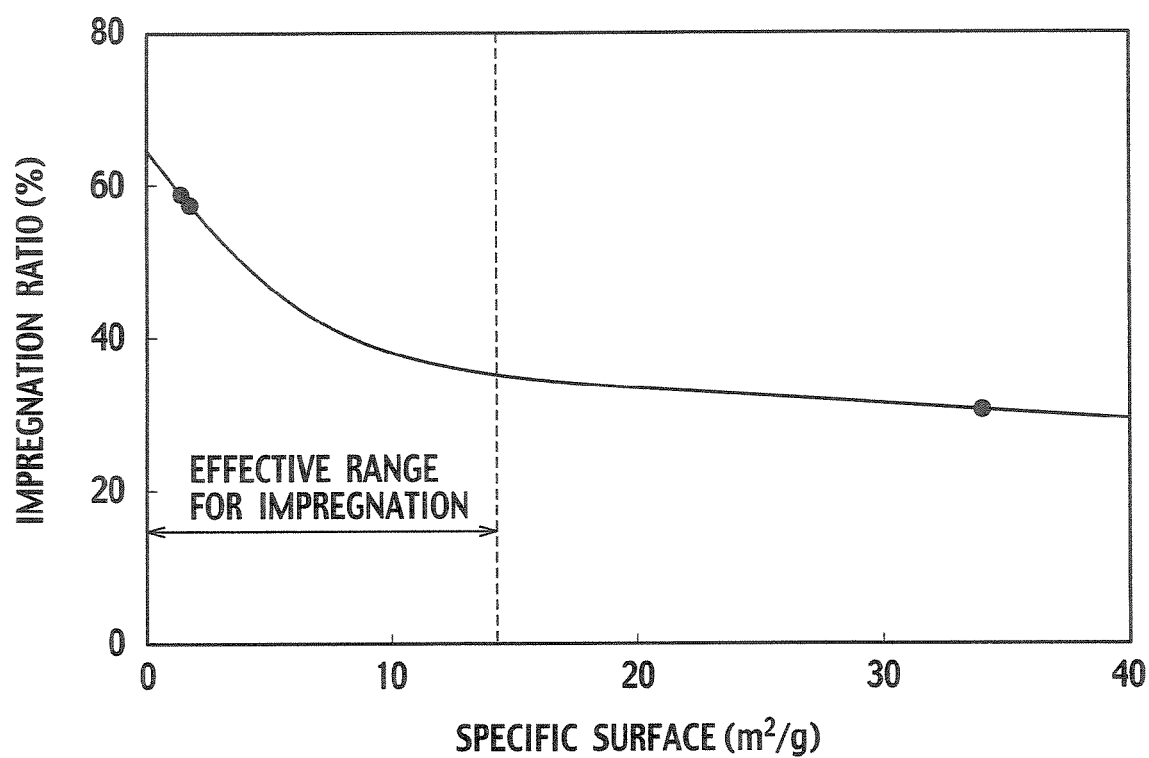
FIG. 5 is a graph showing a relation between specific surfaces of powders of carbon and impregnation ratios.

Measurements of specific surfaces (surface areas per unit weight) and 50% particle sizes with respect to the spherical carbon powder (NICABEADS ICB-0520), the clastic carbon powder (NICABEADS MPX-6), and the laminar carbon powder (UF-G10) were carried out on a BET gas adsorption method. The impregnation ratios before calcination are re-plotted with respect to the measured specific surfaces in the graph of FIG. 5.

TABLE 2 particle sizes and specific surfaces

|  | 50% particle size ($\mu$m) | Specific surface ($m^2/g$) |
|---|---|---|
| Spherical carbon powder | 8.34 | 1.7 |
| Clastic carbon powder | 6.93 | 1.5 |
| Laminar carbon powder | 4.25 | 34 |

It could be generally noted that smaller particle sizes and greater divergence of the shape of the particle from a sphere lead to greater specific surfaces. More specifically, the specific surface is a parameter representative of both fineness of the particle and a degree of divergence of the shape from a sphere. If two particles are equivalent in these particle sizes, a specific surface can be considered as a parameter representative of a degree of divergence of the shape from a sphere. On this consideration, when the measured values of the specific surfaces are converted into values in a case where the particle size is 1 $\mu$m, the specific surface of the spherical carbon powder is 10.395 $m^2/g$ and that of the clastic carbon powder is 14.178395 $m^2/g$. More specifically, the clastic powder has a greater degree of divergence from a sphere. To put it the other way around, a carbon powder having a specific surface up to 14.178395 $m^2/g$ at least provides a sufficient impregnation ratio if a clastic carbon powder is applied in accordance with the present invention.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A method for producing a ceramic composite material, comprising:
   preparing a first mixture consisting essentially of a carbon powder, a silicon powder and an organic solvent;
   resting the first mixture to form a second mixture having a precipitation portion enriched in the carbon powder and the silicon powder relative to the first mixture, and a second portion enriched in the organic solvent relative to the first mixture;
   immersing a fabric of fibers consisting essentially of an inorganic substance in the precipitation portion of the second mixture;
   producing an oscillation in the second mixture containing the fabric of fibers immersed in the precipitation portion to impregnate the fabric of fibers with the carbon powder, the silicon powder, and the organic solvent;
   calcining the fabric of fibers impregnated with the carbon powder, the silicon powder, and the organic solvent to form a silicon carbide in and on the fabric of fibers.

2. The method of claim 1, further comprising:
   leaving the mixture at rest so as to form a precipitation, wherein the fabric is buried in the precipitation at the step of burying.

3. The method of claim 1, wherein the medium includes an organic silicon polymer.

4. The method of claim 3, further comprising:
   preparing the medium so as to have a viscosity of from 0.8 mPaS to 4 mPaS.

5. The method of claim 1, wherein an ultrasonic oscillation is applied at the step of producing.

6. The method of claim 1, wherein the powder of carbon has a grain size of from 1 $\mu$m to 20 $\mu$m and the powder of silicon has a grain size of from 1 $\mu$m to 75 $\mu$m.

7. The method of claim 1, wherein the powder of carbon has a specific surface of 14.2 $m^2/g$ or less.

8. The method of claim 1, wherein the organic solvent consists essentially of xylene.

9. The method of claim 1, further comprising:
   forming a interface layer on the fibers by a CVD method.

10. The method of claim 1, further comprising:
    infiltrating a second ceramic phase of SiC into spaces among the fibers by a CVI method.

11. A method for producing a ceramic composite material, comprising:
    preparing a mixture consisting essentially of a powder of carbon, a powder of silicon, an organic silicon polymer and a medium including an organic solvent and having a viscosity of from 0.8 mPaS to 4 mPaS;
    burying a fabric of fibers consisting essentially of an inorganic substance in the mixture;
    producing an oscillation in the mixture to impregnate the fabric with the mixture; and
    calcining the fabric impregnated with the mixture to form a silicon carbide in and on the fabric of fibers.

12. A method for producing a ceramic composite material, comprising:
    preparing a mixture consisting essentially of a powder of carbon, a powder of silicon and a medium including an organic solvent, wherein the powder of carbon has a specific surface of 14.2 m²/g or less;
burying a fabric of fibers consisting essentially of an inorganic substance in the mixture;
producing an oscillation in the mixture to impregnate the fabric with the mixture; and
calcining the fabric impregnated with the mixture to form a silicon carbide in and on the fabric of fibers.

* * * * *